(12) United States Patent
Huang

(10) Patent No.: US 7,281,562 B2
(45) Date of Patent: Oct. 16, 2007

(54) CURTAIN BLIND POWER CONVERSION DEVICE WITH REVERSE BRAKE EFFECT

(76) Inventor: Hsien-Te Huang, Chung-Hsiao E. Rd., Taipei (TW)

( * ) Notice: Subject to any disclaimer, the term of this patent is extended or adjusted under 35 U.S.C. 154(b) by 320 days.

(21) Appl. No.: 10/952,883

(22) Filed: Sep. 30, 2004

(65) Prior Publication Data

US 2006/0073932 A1    Apr. 6, 2006

(51) Int. Cl.
*E06B 9/32* (2006.01)

(52) U.S. Cl. .................................. 160/168.1

(58) Field of Classification Search ......... 160/168.1 P, 160/176.1 P, 311, 84.02, 291, DIG. 17, 331; 475/341, 342, 900
See application file for complete search history.

(56) References Cited

U.S. PATENT DOCUMENTS

| | | | | |
|---|---|---|---|---|
| 3,130,606 A | * | 4/1964 | Kreis | 475/254 |
| 5,179,989 A | * | 1/1993 | Schon | 160/84.02 |
| 6,116,323 A | * | 9/2000 | Huang | 160/170 |
| 6,379,276 B1 | * | 4/2002 | Cheng | 475/4 |
| 6,794,778 B1 | * | 9/2004 | Walker et al. | 310/77 |
| 6,910,516 B2 | * | 6/2005 | Huang | 160/170 |

* cited by examiner

*Primary Examiner*—Hugh B. Thompson, II
*Assistant Examiner*—Candace L. Bradford
(74) *Attorney, Agent, or Firm*—Troxell Law Office, PLLC

(57) ABSTRACT

A curtain blind power conversion device with reverse brake effect, wherein the power conversion device particularly provides the brake effect and power conversion during course of manipulating slats of the curtain blind. The power conversion device is structured to include a first annular gear and a second annular gear, the two annular gears having different circular pitch and coaxially configured face to face. The first annular gear is fixedly configured, whereas the second annular gear passively rotates, and the two annular gears synchronously engage with a single planetary gear set. Utilization is made of the unequal circular pitch of the two annular gears to produce an angular speed difference, where upon the second annular gear being subject to an external force feedback, the reverse brake effect is thereby assuredly achieved.

2 Claims, 8 Drawing Sheets

CURTAIN BLIND POWER CONVERSION DEVICE WITH REVERSE BRAKE EFFECT

BACKGROUND OF THE INVENTION (a) Field of the Invention

The present invention relates to a curtain blind power conversion device with reverse brake effect, and more particularly to the conversion device that provides a power terminal that achieves torsional conversion and the reverse brake effect for horizontal or vertical curtain blinds. The conversion device primarily utilizes two annular gears, wherein number of teeth and module of the two annular gears are unequal. The two annular gears synchronously engage with a single planetary gear set, and utilization is made of the unequal circular pitch and module of the two annular gears to produce an angular speed difference, thereby realizing a deceleration output motive force, and with the planetary gear set being subject to a fixed restriction of a first annular gear, the reverse brake effect is thereby achieved.

(b) Description of the Prior Art

Primary application of the present invention is in usage as a reverse brake for curtain blinds. Referring to FIG. 1, which shows a conventional curtain blind 1, wherein, in order to achieve object of the reverse brake, the curtain blind 1 is configured with a drive unit 12 having an energy potential.

The drive unit 12 is actuated by means of a worm gear 124 (see FIG. 2) through a worm 125 utilizing a relatively high slip ratio of inclined screw teeth. Wherein the worm 125 is driven by means of a sprocket wheel 126 through manual operation of a beaded chain 121, whereby turning power generated is same as that obtained by means of an electric motor 20 substituting for the sprocket wheel 126.

The drive unit 12 synchronously drives two take-up tubes 123 through an angle-shaped transmission rod 122 (see FIG. 1). The take-up tubes 123 actuate slats 14 configured lower to the take-up tubes 123 by means of pull wires 141, thereby taking up and letting down the slats 14 therewith. Anti-glare angle of the horizontal slats 14 is regulated by adjustment of angle of elevation through tilt leaves 13 actuating ladder cords 142.

However, because the aforementioned curtain blind 1 is fitted on a window, force of wind blowing from outside causes the curtain blind 1 to move, and thereby results in the slats 14 sliding down. After the slats 14 have slid down, motive force of the wind consequently effectuates a reverse direction transmission to the drive unit 12 through the take-up tubes 123, and indirectly through the transmission rod 122, subsequently the drive unit 12 is subject to a relatively large external force feedback, which produces slippage thereat.

FIG. 2 depicts an improved brake configuration presently employed in curtain blinds, and because the worm gear 124 is positioned within a top horizontal rail 11, dimensions of the brake configuration is small in proportion, moreover, force is transmitted to a single tooth of the worm gear 124 through engagement with the worm 125, which thus forms a tooth surface pressure on a large single spot, subsequently the worm gear 124 or spiral teeth of the worm 125 are easily damaged, causing dislodging of the gears to occur, and thereby object of locking is lost.

Furthermore, the aforementioned drive unit 12, in similar fashion, can actuate taking up and letting down of cloth curtains, and similarly, because of effect of the force of wind pressure and own weight of the cloth curtains, the cloth curtains also require the drive unit 12 to provide an effective reverse brake.

Referring to FIG. 2A, which shows another horizontal type curtain blind having a traditional design primarily embodying a lift-drop cord 140 and a slat tilt rod 120, wherewith the slats 14 are taken up or let down, and angle of incident light is adjusted. Basic configuration comprises the top horizontal rail 11 and the horizontal slats 14 connected lower thereof. Adjustment to the slats 14 is carried out by pull operating on the lift-drop cord 140, thereby achieving raising and taking up of the slats 14 or letting down and unfolding of the slats 14. Upon unfolding of the slats 14, the slat tilt rod 120 is employed to regulate the angle of incidence the slats 14 make with incoming light; moreover, the slat tilt rod 120 effectuates linkage with the worm 125 thereof. Through the worm 125 rotatedly engaging with the worm gear 124, the worm gear is thereby enabled to outwardly actuate the transmission rod 122, whereupon regulating angle of incident light for the slats 14 can thereby be realized. Furthermore, utilizing the worm 125 engaging with the worm gear 124 can achieve an external force that effectuates an opposing brake effect.

Because the horizontal type slats 14 are generally fitted at a maximum elevation of approximately 30 feet. Because, firstly, dimensions of packaging is restrictive, and secondly, if the slat tilt rod 120 is utilized to regulate angle of incoming light, then length of the slat tilt rod 120 must also be close on 30 feet in length, thus the long slat tilt rod 120 is unsuitable for usage. Hence, a sprocket drive method is adopted in replacement of the slat tilt rod 120.

Referring to FIG. 2B, which shows the sprocket drive method, which traditionally operates in coordination with satellite gears to enlarge torsional force and effectuate a brake configuration. The sprocket drive is primarily configured for the beaded chain 121 to actuate the sprocket wheel 126, and the sprocket wheel 126 actuates a conversion drive in a direction of the transmission rod 122 through a planetary gear set 18. The planetary gear set 18 is subject to a motive power from the sprocket wheel 126 linkage to a sun gear 181. Satellite gears 182 of the outer meshing ring are also subjected to corresponding meshing with a fixed annular gear, thereby enabling an attached carrier plate 180 to corotate. The carrier plate 180 externally connects to a shaft 190, and after the shaft 190 is distanced from a brake spring 192, linkage actuation of an output shaft 191 is effectuated. The output shaft 191 is externally linked to the transmission rod 122, and the brake spring 192 utilizes space between an external surface of the shaft 190 and the output shaft 191 to implement operation of radial opening or internal shrinkage, thereby if a transmission force is transmitted to the axle 190, the output shaft 191 will be subject to effect of the brake spring 192, and a constraint reacting force is generated thereat, thus achieving object of stopping reverse movement.

The principle of the constraint reacting force is such that one end of the brake spring 192 is peripherally fixed, thereby enabling diameter of the brake spring 192 to be variated through an axial torsion, for instance, when the diameter of the brake spring 192 is reduced, the constraint reacting force effect is thereupon generated. Design of the brake spring 192 is that of a mechanical design of a general brake spring for a curtain rail, and thus is not described in further detail herein.

Referring to configuration of FIG. 2B, the sprocket drive depicted applies a similar related drive structure as shown in FIG. 1, whereby the single beaded chain 121 achieves letting down and opening of the slats 14 and regulation of the angle the slats 14 make with irradiating light.

Although utilizing the beaded chain 121 enables achieving the various aforementioned functions, wherein the brake effect utilizes the constraint of reaction force or letting down operation or opening operation of the brake spring 192. However, upon the constraint reaction force and circumferential surface of the shaft 190 surpassing a critical limit, slippage still occurs and thus loss of locking functionality thereof.

Referring to FIG. 3, which shows a conventional design for a vertical curtain blind, wherein the drive unit 12 is configured in the top rail 11, and vertical slats 14 are connected to hanging shafts 15 configured below the top rail 11. The drive unit 12 is similarly actuated through an external force by means of manual operation of an operating cord 16.

Referring to FIG. 4, which shows an umbrella gear set 17 connected to one of the hanging shafts 15, below which is connected the slats 14. The umbrella gear set 17 is subject to horizontal actuation from the angle-shaped transmission rod 171, and whereby the transmission rod 171 is subject to actuation from the drive unit 12.

Utilizing actuation of the drive unit 12 thereby enables the umbrella gear set 17 to transfer drive to the hanging shafts 15, which thereon connectively actuate the slats 14, and thus realizes regulating angle of incident light hitting the slats thereof. However, surface pressure from force of natural wind effectuates producing a twisting phenomenon on the slats 14, which thereby blows the slats 14 into disorder, and thus the originally appropriately angled slats 14 become disorientated. Hence, a requirement for a braking method fitted on the drive unit 12 is necessary to effectively brake the angle-shaped transmission rod 171.

In order to prevent the transmission rod 171 from being subject to a reverse force from the hanging shafts 15, which is thereby indirectly transmitted to the drive unit 12, configuration of the drive unit 12 generally follows a structural principle depicted in FIG. 2, whereby a worm and a worm gear are utilized to achieve the brake effect. However, teeth of the worm and the worm gear are similarly subject to possibility of easily being damaged.

Recently, the brake effect utilizes a configuration embodying a magnetic-type mechanical control switch or other automatic devices having electrical components. However, electrical power is necessary in order to utilize such devices, and, moreover, configuration comprises complicated components.

SUMMARY OF THE INVENTION

In order to effectively accomplish a reverse brake effect, and simultaneously achieve deceleration conversion, the present invention utilizes a first annular gear and a second annular gear coaxially configured face to face. Module and circular pitch of the two annular gears are unequal, however, measure of pitch diameter is such that synchronous engagement with a single planetary gear set is realized.

Wherein the module of the planetary gear set is equal to that of the first annular gear, moreover, because the first annular gear is fixedly configured to a housing, thus after a sun gear has engaged with the planetary gear set, the second annular gear is thereupon engaged, and because periphery of the second annular gear set is not fixed, thus, after the planetary gear set has been actuated, the planetary gear set rotates with an angular speed difference, and rotational transmission is realized to an output shaft terminal thereof.

An external end of the second annular gear is connected to an output shaft, which connectively actuates an angle-shaped transmission rod. Upon the angle-shaped transmission rod being subject to an external force and thus a feedback counterforce being generated, which will be first transmitted to the second annular gear, whereupon the second annular gear will first engage with the planetary gear set. However, gear rack of another end of the planetary gear set engages with the fixed first annular gear, and is thus subject to limiting lock of the first annular gear, thereby achieving the reverse brake effect.

To enable a further understanding of the said objectives and the technological methods of the invention herein, the brief description of the drawings below is followed by the detailed description of the preferred embodiments.

BRIEF DESCRIPTION OF THE DRAWINGS

FIG. 2-A shows a front schematic view of a conventional horizontal curtain blind.

DETAILED DESCRIPTION OF THE PREFERRED EMBODIMENTS

Figure 2:
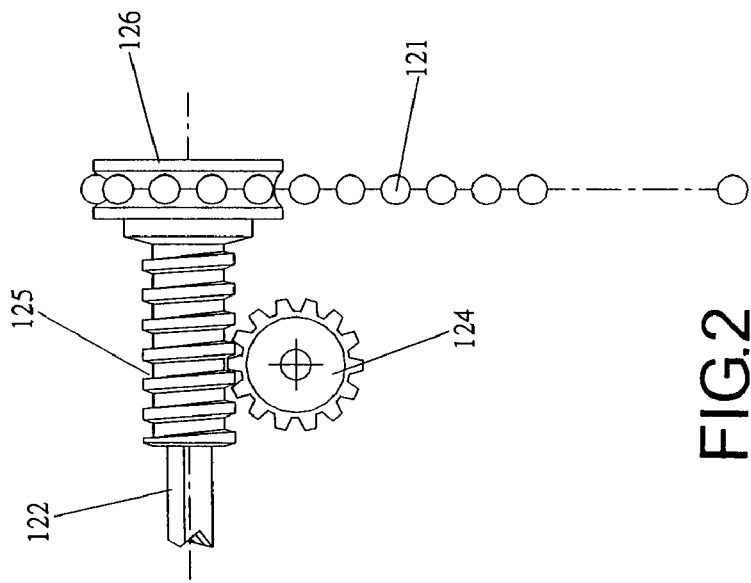
FIG. 2 shows a structural schematic view of a conventional drive unit.
Figure 1:
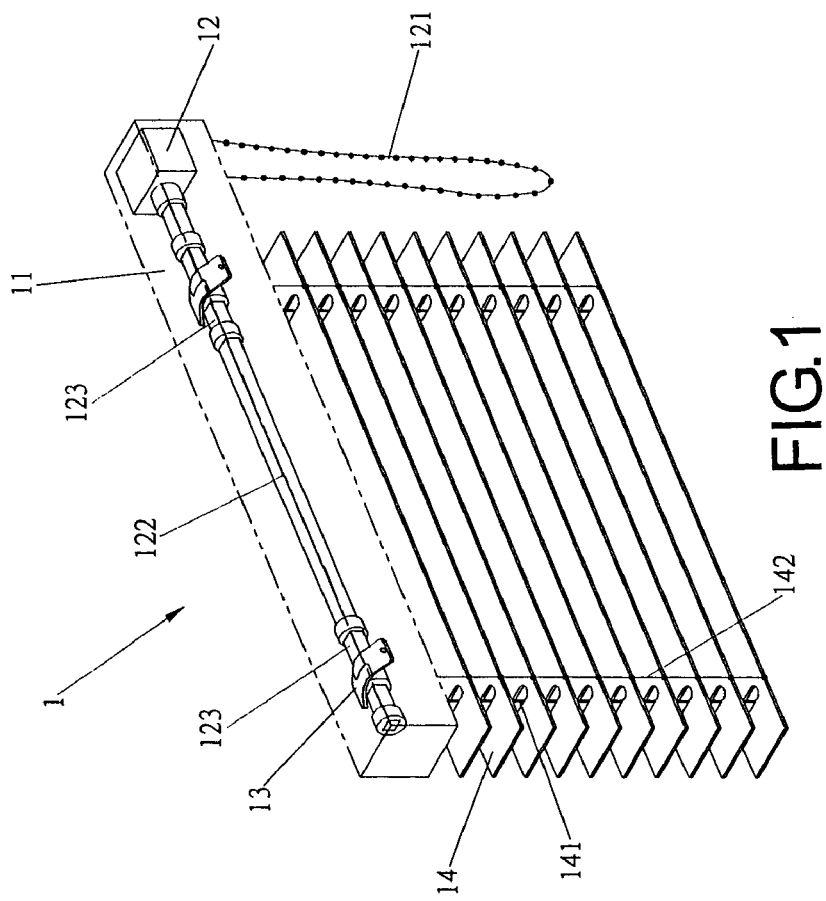
FIG. 1 shows an elevational schematic view of a general horizontal curtain blind.
Figure 2A:
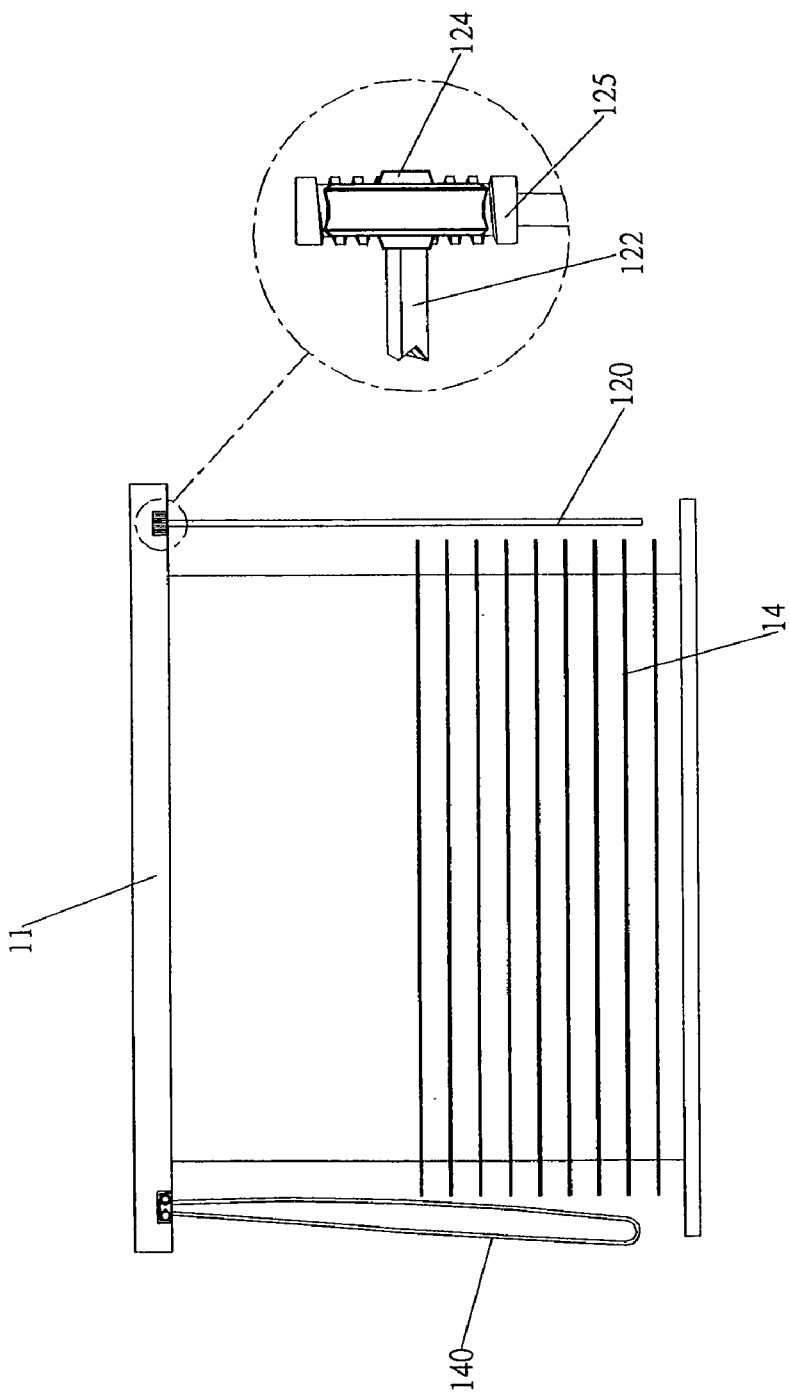
FIG. 2B shows a structural view of the conventional drive unit utilizing a beaded chain to drive same.
Figure 2B:
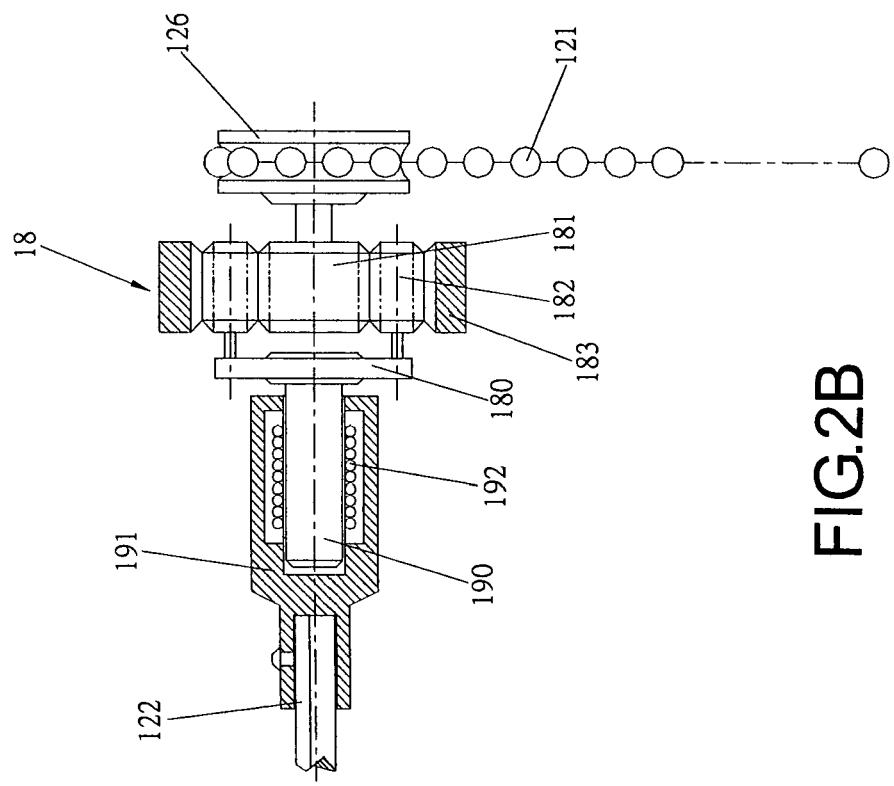
Figure 4:
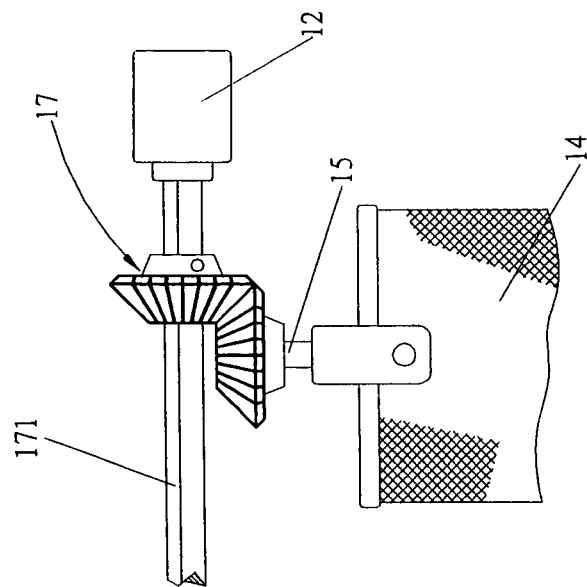
FIG. 4 shows a schematic view of an angled transformer device of the conventional vertical curtain blind.
Figure 3:
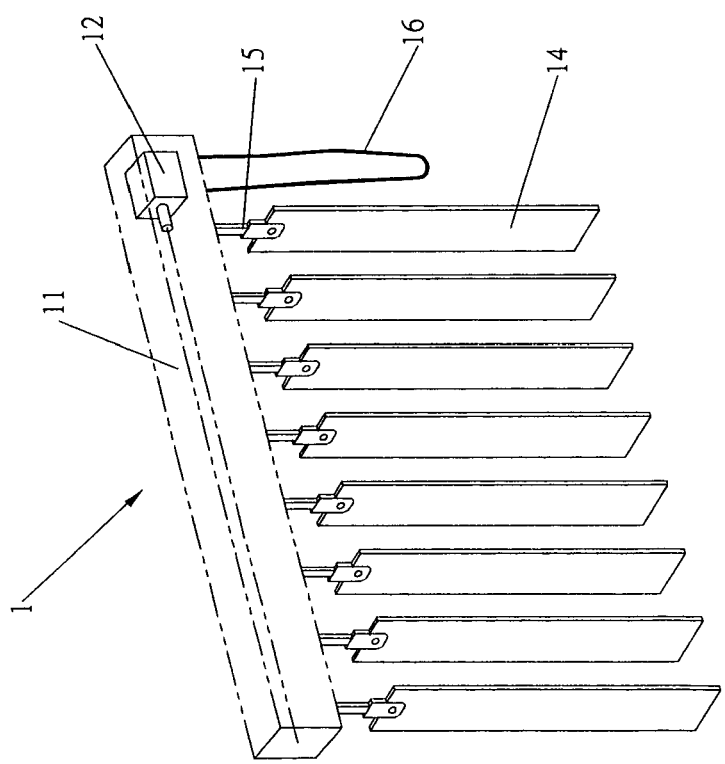
FIG. 3 shows a structural schematic view of a conventional vertical curtain blind.
Figure 5:
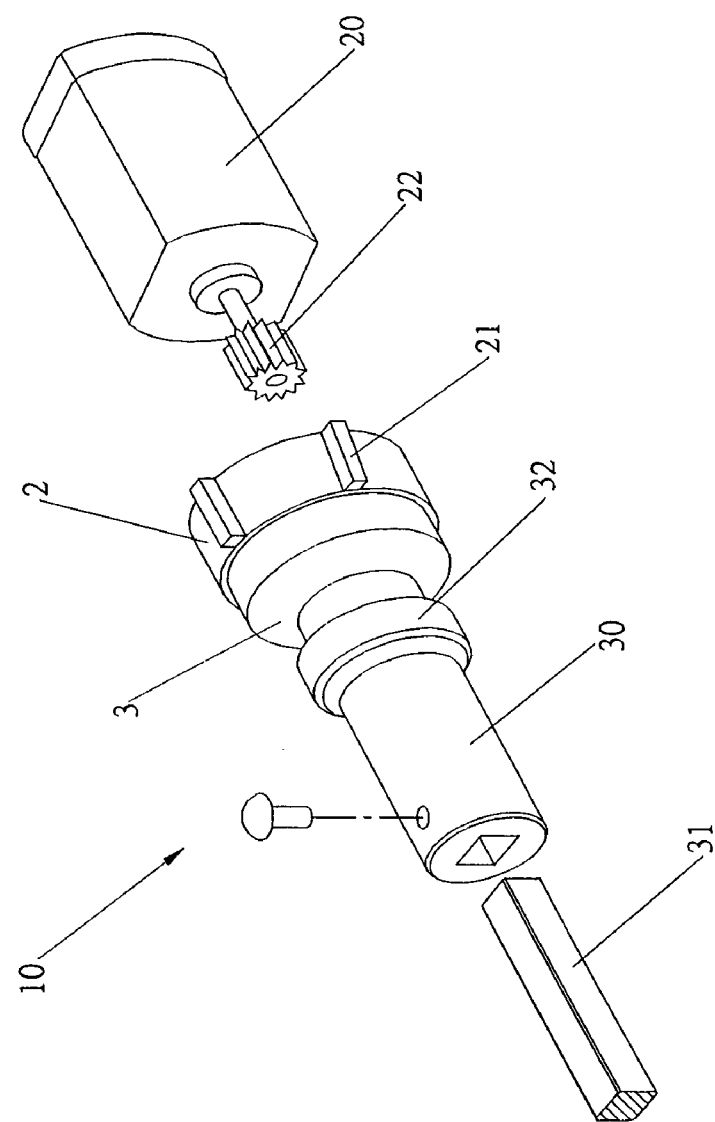
FIG. 5 shows a structural elevational view according to the present invention.

With regard to an embodiment of the present invention, referring to FIG. 5, which shows a conversion device 10 that acquires a reverse motive force through an electric motor 20 or manually, and thereon through a sun gear 22 transmission. The conversion device 10 comprises a first annular gear 2 and a second annular gear 3, wherein the two annular gears 2 and 3 are coaxially configured face to face.

Figure 6:
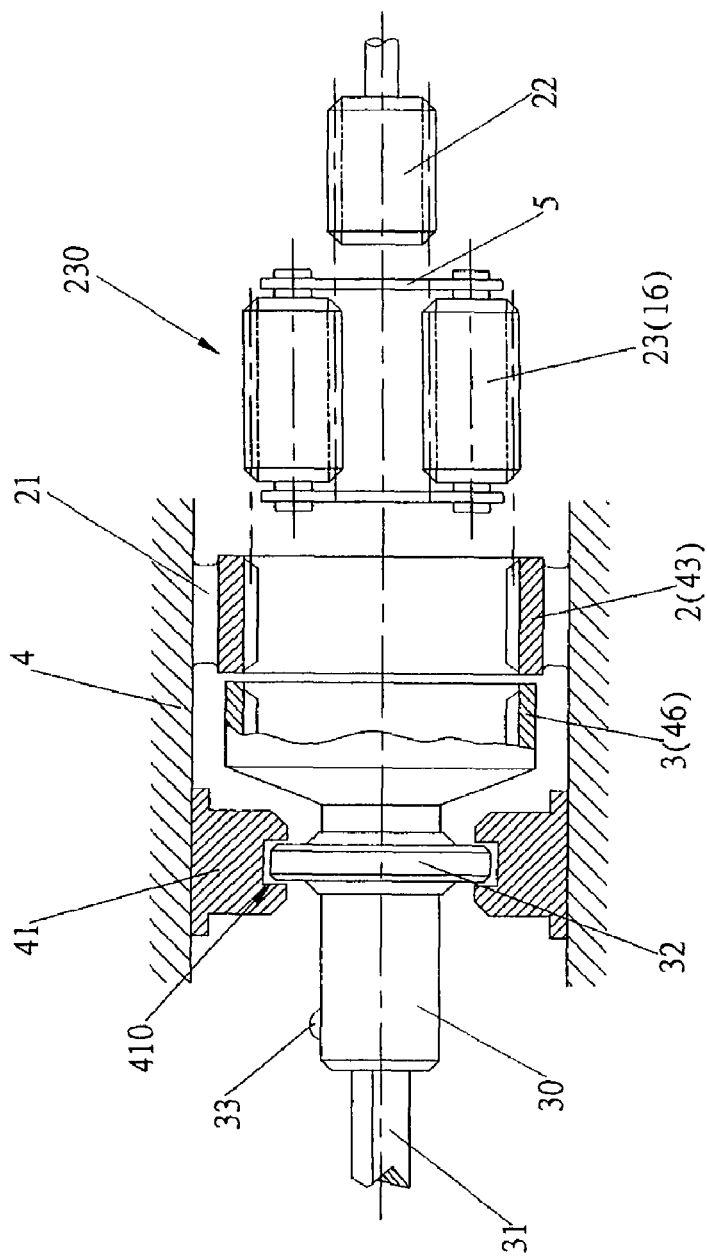
FIG. 6 shows a side view of gear engagement relationship according to the present invention.

The first annular gear 2 is externally fixed to a housing 4 by means fixing members 21 (see FIG. 6). An external end of the second annular gear 3 is connected to an output shaft 30. A center of the output shaft 30 is directed outwards and actuates an angle-shaped transmission rod 31, whereby functionality of the transmission rod 31 is same as the angle-shaped transmission rods depicted in FIGS. 1, 2, 3 and 4.

A limiting disc 32 is further configured on a body of the output shaft 30, and apart from the limiting disc 32 having functionality that allows the annular gear 3 to be radial movable fixed, the limiting disc 32 is also subject to containment in a holding groove 410 of a slide support 41 (see FIG. 6) by means of an edge surface of the limiting disc 32. Thus, if the angle-shaped transmission rod 31 is subjected to an external force, which thereby forms an extrusion push in a longitudinal direction, the limiting disc 32 being movable fixed, thereupon maintains axial positioning thereat. The extrusion force is that inclined frictional inverted acting force generated after the aforementioned slats 14 have been subjected to a force transmitted from the transmission shaft 31. The axial extrusion acting force is a phenomenon often seen in a conventional curtain blind configured with the take-up tubes 123 (see FIG. 1).

With further reference to FIG. 6, the first annular gear 2 and the second annular gear 3 are coaxially configured so as to form a relative abutment there between, moreover, the first annular gear 2 is fixedly configured to the housing 4 by means of the fixing members 21. An output terminal of the second annular gear 3 locks on and thereby is connected to the angle-shaped transmission rod 31 by means of a fixing member 33. The limiting disc 32 configured on the body of the output shaft 30 being subject to sliding placement in the holding groove 410 of the fixed slide support 41 thereby maintains radial and axial movable fixing thereof.

The sun gear 22 engaging with the planetary gear set 230 actualizes transmission to entire motive power input terminal. Width of each of the satellite gears 23 is sufficient to synchronously engage with the first annular gear 2 and the second annular gear 3, thus the two annular gears 2 and 3 are subject to synchronous meshing by the single planetary gear set 230. The satellite gears 23 are movably fixed to one triangular support 5.

Circular pitch (cp) of the first and second annular gears 2 and 3 are unequal, wherein the circular pitch of the second annular gear 3 is relatively smaller than that of the first annular gear 2, whereas, in contrast, number of teeth (t) of the second annular gear 3 is relatively greater than number of teeth of the first annular gear 2, and the additionally configured number of teeth on the second annular gear 3 are in accordance with number of satellite gears 23, wherein three satellite gears 23 are configured in the embodiment of the present invention, and, accordingly, an additional three teeth are configured on the second annular gear 3. Employing the formula module=pitch diameter/number of teeth (m=d/t), under condition whereby the pitch diameter (d) is fixed, and the number of teeth t are altered, thus the module m similarly undergoes change as a result.

Furthermore, the circular pitch (cp) equals $\pi$ (pi: ratio of a circumference of a circle to diameter) multiplied by the pitch diameter, and subsequently divided by the number of teeth (cp=$\pi$d/t). Under the previous conditions of the pitch diameter d being a constant factor, and the number of teeth t being altered, the circular pitch cp similarly changes as a result.

Figure 7:
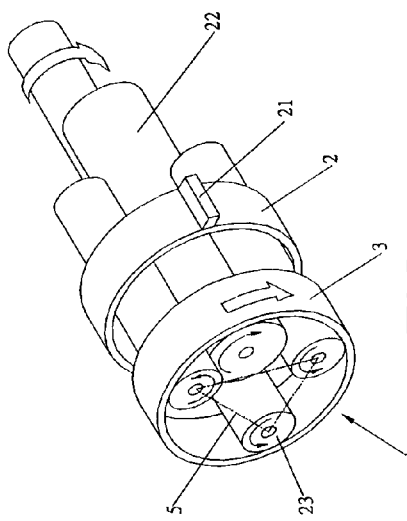
FIG. 7 shows a basic structural elevational view of an output terminal according to the present invention.

Referring to FIG. 7, which shows an arrangement of a gear system of the present invention, and in order to portray easy viewing and understanding FIG. 7 primarily depicts the sun gear 22 disposedly engaging with the planetary gear set 230 of the triangular support 5. The planetary gear set 230 first engages with the first annular gear 2, wherein the first annular gear 2 is fixed to the housing 4 by means of the fixing members 21, and thereby deemed to be in a fixed state thereof.

The satellite gears 23 outwardly extend to engage with and thereby rotate the second annular gear 3. Upon the sun gear 22 rotating in a clockwise direction, the satellite gears 23 are actuated to rotate in a counterclockwise direction, and the triangular support 5 is simultaneously made to corotate in the same clockwise direction as the sun gear 22. Rotational speed of the triangular support 5 multiplied by rotational speed of the satellite gears 23 therewith drives the second annular gear 3, and forms a rotation in the same clockwise direction. Furthermore, the output shaft 30 extends outward from the second annular gear 3 (see FIG. 6), thus forming a deceleration that magnifies torsion output and enables the angle-shaped transmission rod 31 to acquire high torsion transmission.

Figure 8:
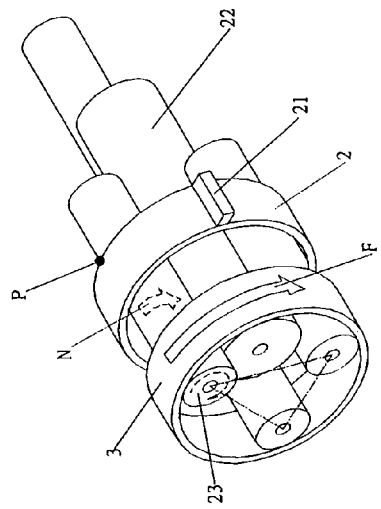
FIG. 8 shows an elevational view of braking effect of the output terminal according to the present invention.

An external force feedback can also effectuate a brake effect. Referring to FIG. 8, if the second annular gear 3 is subjected to a return transmission active force F from the angle-shaped transmission rod 31 (see FIG. 6), then the second annular gear 3 rotates and inwardly engages with the satellite gears 23. Hence, upon the satellite gears 23 being necessarily subject to engaging, a turning power n is thereby generated, and gear teeth 231 at one end of the satellite gears 23 engage with the first annular gear 2, under condition of the first annular gear 2 being fixedly configured to the housing 4, then the turning power n is locked at a tangent p, which thereby disables the active force F from producing a displacement thereat. With the brake effect as described, the active force F effectuates the same locking effect whether rotation is clockwise or counterclockwise. Simply explained, under condition of the first annular gear 2 being fixed, the second annular gear 3 and the first annular gear 2 move in a relative motion, and If the second annular gear 3 actuates the inner satellite gears 23, thereupon one end of the satellite gears 23 engage with the first annular gear 2. However, because the first annular gear 2 is fixed, thus the satellite gears 23 are similarly fixed and unable to rotate, accordingly, the second annular gear 3 also is unable to rotate, hence a reverse locking effect is formed thereof.

Figure 9:
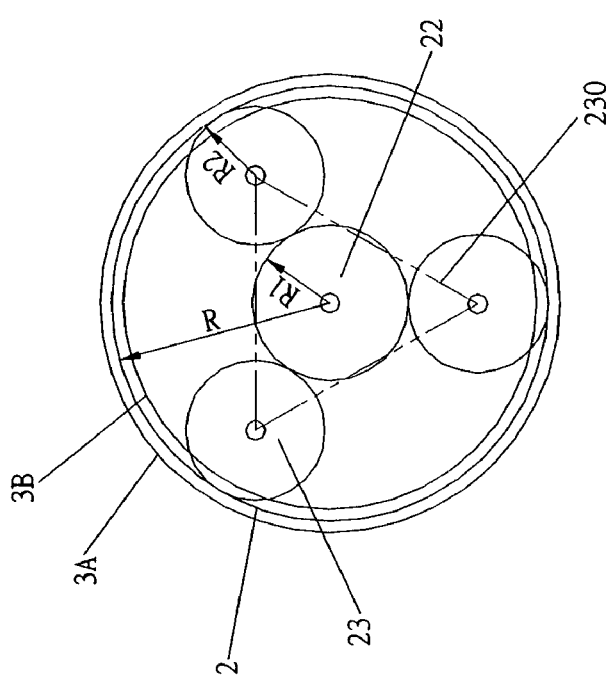
FIG. 9 shows a front view of state of the output terminal rotational speed ratio according to the present invention.

Referring to FIG. 9, which shows a particular alteration of pitch circle of the second annular gear 3 of the present invention, and arrangement of the gears after alteration thereof. As depicted in FIG. 9, wherein the sun gear 22 engages with the satellite gears 23, the satellite gears 23 being movable fixed within range of the triangular support 5.

Radius of the sun gear 22 is R1, and radius of each of the satellite gears 23 is R2, thus, radius of the first annular gear 2 R=R1+R2. As depicted in FIG. 9, under condition of a fixed rotating speed of the sun gear 22, working operation of the satellite gears 23 under the same corresponding condition similarly realizes a fixed rotating speed.

Another end of the satellite gears 23 engage with the second annular gear 3, whereby pitch diameter of the second annular gear 3 is larger d1 or smaller d2 than pitch diameter of the first annular gear 2, and pitch circle of the second annular gear 3 is configured to be relatively larger 3a or relatively smaller 3b. On the basis that the circular pitch (cp) of mutual engaging of the gears is necessarily equal, otherwise interference will occur, and from the formula cp=$\pi$d/t, the present invention can by keeping m (where m=d/t) constant, and altering the number of teeth t, thereby cause the pitch diameter d to correspondingly change accordingly. Therefore, under condition of a fixed engaging axial rotational speed output by the satellite gears 23, the second annular gear 3 having a relatively larger pitch diameter d is thereby abled to produce an even larger deceleration ratio, moreover, rotation of the second annular gear 3 and the sun gear 22 are decelerated in same direction. Furthermore, because the pitch diameter d of the second annular gear 3 is smaller, and with radius of the satellite gears 23 being fixed, a relatively high-speed rotational engagement is realized. Hence, size of pitch circumference ($\pi \times$d) of the second annular gear 3 will affect varied alterations in rotational speed thereof.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A curtain blind power conversion device with reverse brake effect, whereby upon a drive unit being subject to an external force, a conversion device provides the reverse brake effect and power conversion; comprising the power conversion device configured on a drive terminal that operates slats of the curtain blind, and characterized in that the power conversion device is constructed from a first annular gear and a second annular gear, the two annular gears being coaxially configured; the first annular gear is fixedly configured to a housing of a top horizontal rail, and the second annular gear outwardly connects to an output shaft; the output shaft outwardly engages with a transmission rod, and the two annular gears synchronously engage with a single planetary gear set, wherein a limiting disc is configured on a girth portion of the output shaft, and which is movable fixed by means of a fixed slide support.

2. The curtain blind power conversion device with reverse brake effect according to claim 1, wherein a circular pitch of the second annular gear is smaller than a circular pitch of the first annular gear.

* * * * *